US012089301B1

(12) United States Patent
Tebbe et al.

(10) Patent No.: US 12,089,301 B1
(45) Date of Patent: Sep. 10, 2024

(54) MATERIAL, APPARATUS, AND METHOD FOR ELECTRICALLY SHIELDING HEATED COMPONENTS

(71) Applicant: WAGSTAFF, INC., Spokane Valley, WA (US)

(72) Inventors: Nicholas Ryan Tebbe, Spokane Valley, WA (US); Jacob Lee Kerbs, Spokane Valley, WA (US)

(73) Assignee: WAGSTAFF, INC., Spokane Valley, WA (US)

( * ) Notice: Subject to any disclaimer, the term of this patent is extended or adjusted under 35 U.S.C. 154(b) by 0 days.

(21) Appl. No.: 18/356,773

(22) Filed: Jul. 21, 2023

Related U.S. Application Data

(63) Continuation of application No. 18/305,033, filed on Apr. 21, 2023.

(51) Int. Cl.
H05B 1/02 (2006.01)
F27D 11/02 (2006.01)
H02H 3/16 (2006.01)
H02H 3/18 (2006.01)
H05B 3/18 (2006.01)
H05B 3/48 (2006.01)
H05B 3/62 (2006.01)

(52) U.S. Cl.
CPC ............... H05B 3/62 (2013.01); F27D 11/02 (2013.01); H02H 3/18 (2013.01); H05B 1/023 (2013.01); H05B 3/48 (2013.01); H02H 3/16 (2013.01)

(58) Field of Classification Search
None
See application file for complete search history.

(56) References Cited

U.S. PATENT DOCUMENTS 3,970,817 A * 7/1976 Boyd ....................... H05B 3/48
219/544
4,949,420 A 8/1990 Eustache
4,975,563 A 12/1990 Roebuck et al.
(Continued)

FOREIGN PATENT DOCUMENTS

CN 1252018 A 5/2000
CN 1781626 A 6/2006
(Continued)

OTHER PUBLICATIONS

EP-0141688-A1, May 1985, Curtila, partial translation. (Year: 1985).*
(Continued)

Primary Examiner — Joseph M. Pelham
(74) Attorney, Agent, or Firm — Alston & Bird LLP

(57) ABSTRACT

A system, method, and apparatus are provided for electrically shielding heated components, and more particularly, to electrically shielding electrically heated components in such a way as to be compatible with GFCI (ground fault circuit interrupter) protected circuits. Examples include an electrically shielded heated component including: a conductor, where the conductor is a heating element connected between a power line and a neutral line of a circuit from a GFCI; and a shield proximate the conductor and connected to the GFCI, where the shield receives a portion of current from the conductor and returns the portion of the current received to the GFCI.

21 Claims, 14 Drawing Sheets

(56) References Cited

U.S. PATENT DOCUMENTS

| | | | |
|---|---|---|---|
| 5,061,526 A | | 10/1991 | Robyn et al. |
| 5,316,071 A | | 5/1994 | Skinner et al. |
| 5,361,183 A | * | 11/1994 | Wiese .................... B64D 15/12 |
| | | | 361/42 |
| 5,642,248 A | * | 6/1997 | Campolo ............... H02H 7/226 |
| | | | 361/45 |
| 5,947,716 A | | 9/1999 | Bellamy et al. |
| 6,084,207 A | * | 7/2000 | Jones ..................... H01Q 3/005 |
| | | | 219/544 |
| 6,107,611 A | * | 8/2000 | Jones ..................... H01Q 3/005 |
| | | | 219/505 |
| 6,218,647 B1 | * | 4/2001 | Jones ..................... H01Q 3/005 |
| | | | 219/544 |
| 6,303,905 B1 | * | 10/2001 | Chiles ..................... H05B 3/56 |
| | | | 219/544 |
| 6,444,165 B1 | * | 9/2002 | Eckert .................... F27D 3/145 |
| | | | 266/200 |
| 6,958,463 B1 | * | 10/2005 | Kochman ................ H05B 3/56 |
| | | | 219/505 |
| 6,973,955 B2 | * | 12/2005 | Tingey ................... B22D 35/06 |
| | | | 266/200 |
| 7,033,538 B2 | * | 4/2006 | Eckert .................... F27D 3/145 |
| | | | 266/200 |
| 8,883,070 B2 | | 11/2014 | Reeves et al. |
| 9,095,896 B2 | | 8/2015 | Vincent |
| 9,248,497 B2 | | 2/2016 | Vincent |
| 9,781,776 B2 | * | 10/2017 | Vincent ............... F27D 99/0006 |
| 9,845,270 B2 | | 12/2017 | Vincent |
| 9,993,870 B2 | | 6/2018 | Tremblay et al. |
| 10,099,285 B2 | | 10/2018 | Vincent |
| 2002/0048305 A1 | | 4/2002 | Eckert |
| 2005/0247700 A1 | * | 11/2005 | Kochman ................ H05B 3/56 |
| | | | 219/544 |
| 2008/0007880 A1 | * | 1/2008 | Bradley ............... H02H 11/002 |
| | | | 361/42 |
| 2009/0020567 A1 | | 1/2009 | Numano et al. |
| 2011/0216451 A1 | * | 9/2011 | Haines ................... H02H 3/338 |
| | | | 361/93.6 |
| 2012/0140362 A1 | * | 6/2012 | Robins ..................... H05B 3/36 |
| | | | 361/18 |
| 2013/0334744 A1 | | 12/2013 | Tremblay et al. |
| 2014/0319188 A1 | | 10/2014 | Kusic |
| 2016/0366727 A1 | | 12/2016 | Vincent et al. |
| 2018/0172351 A1 | | 6/2018 | Ofallon et al. |
| 2022/0111434 A1 | * | 4/2022 | Tebbe .................... B22D 7/068 |

FOREIGN PATENT DOCUMENTS

| | | | | |
|---|---|---|---|---|
| CN | 101041178 A | | 9/2007 | |
| CN | 102519258 A | | 6/2012 | |
| CN | 104006646 A | | 8/2014 | |
| CN | 104114302 A | | 10/2014 | |
| CN | 104421937 A | | 3/2015 | |
| CN | 106457377 A | | 2/2017 | |
| DE | 2331137 A1 | | 1/1974 | |
| DE | 102012102549 A1 | | 5/2013 | |
| EP | 0141688 A1 | * | 5/1985 | |
| GB | 1440265 | | 6/1976 | |
| JP | 62-084864 | | 4/1987 | |
| JP | 01131079 | | 5/1989 | |
| JP | H03-042354 | | 2/1991 | |
| JP | 2000-210761 | | 8/2000 | |
| JP | 2001339842 A | * | 12/2001 | ............... H02H 3/14 |
| KR | 10-0914031 B1 | | 8/2009 | |
| RU | 2107237 C1 | | 3/1998 | |
| RU | 2303744 C2 | | 7/2007 | |
| RU | 2304600 C2 | | 8/2007 | |
| RU | 70173 U1 | | 1/2008 | |
| RU | 2358831 C2 | | 6/2009 | |
| RU | 2549232 C2 | | 4/2015 | |
| RU | 2549817 C2 | | 4/2015 | |
| SU | 376993 A1 | | 3/1978 | |
| SU | 628991 A1 | | 10/1978 | |

OTHER PUBLICATIONS

International Search Report and Written Opinion for PCT/US2021/053716 (ISA/EP) mailed May 23, 2022 (17 pages).
1st Office Action for China Patent Application No. 202180069144.0 dated Jan. 24, 2024 w/English translation (26 pages).
Search Report for Russian Patent Application No. 2023111439/05 dated Apr. 16, 2024 w/English translation (6 pages).
Office Action for Russian Patent Application No. 2023111439/05 dated Apr. 17, 2024 (8 pages).
English translation of Office Action issued for Japan Patent Application No. 2023-521580 mailed May 13, 2024 (8 pages).

* cited by examiner

MATERIAL, APPARATUS, AND METHOD FOR ELECTRICALLY SHIELDING HEATED COMPONENTS

CROSS-REFERENCE TO RELATED APPLICATIONS

This application is a continuation of and claims priority to U.S. patent application Ser. No. 18/305,033, filed on Apr. 21, 2023, the contents of which are herein incorporated by reference in their entirety.

TECHNOLOGICAL FIELD

The present disclosure relates to a system, apparatus, and method for electrically shielding heated components, and more particularly, to electrically shielding electrically heated components in such a way as to be compatible with GFCI (ground fault circuit interrupter) protected circuits.

BACKGROUND

Electrical heating elements are used in a wide variety of applications and provide generally reliable and controllable heating of various materials. Electrical heating elements convert electrical energy into heat energy. Typically electrical heating elements are formed of a resistive material that produces heat when current is applied. Upon application of current, the electrically resistive element heats, and the heat is dissipated to materials proximate the electrical heating element. These electrical heating elements can be employed in radiant heaters where the heating elements emit radiant heat to an area proximate the heater. Optionally, the electrical heating element can be embedded or partially embedded in a ceramic insulation, such as ceramic fiber, to direct the heat.

Other applications for heating elements include heating elements that are used to heat materials proximate the heating elements. Such applications include in-floor heating, plumbing pipe-wrap heaters, oven and stove heating elements, etc. The heating elements may be encased or proximate a material which may be electrically insulating at standard temperature and pressure to thermally insulate the heating element or to help direct heat from the heating element in a particular direction. The insulative properties of the material may diminish as the material is heated. In such cases, the material may become a conductor of electricity, albeit a relatively poor conductor. This can lead to current leakage from the heating element.

BRIEF SUMMARY

The present disclosure relates to electrically shielding heated components, and more particularly, to electrically shielding electrically heated components in such a way as to be compatible with GFCI (ground fault circuit interrupter) protected circuits. Embodiments provided herein include an electrically shielded heated component including: a conductor, where the conductor is a heating element powered and protected through a GFCI; and a shield proximate the conductor, where the shield receives a portion of current from the conductor and returns the portion of the current received to the GFCI. The shield of an example embodiment returns the portion of the current to the GFCI by way of a neutral conductor. The neutral conductor of an example embodiment is in electrical communication with the heating element. The portion of the current received at the shield includes, in some embodiments, current leakage from the conductor, where the current leakage is above an amperage that would result in the GFCI tripping if not returned to the GFCI by the shield.

According to some embodiments, the conductor and the shield are at least one of: embedded within, partially embedded within, or affixed to the electrically shielded heated component. According to some embodiments, the electrically shielded heated component becomes increasingly electrically conductive at temperatures exceeding 400 degrees Celsius. The portion of the current includes, in some embodiments, current leakage resulting from the electrical conductivity at elevated temperature exceeds 5 mA. The conductor of an example embodiment is configured to heat a surface of the refractory component to at least 400 degrees Celsius. The refractory component of some embodiments is configured to contact molten metal.

Embodiments provided herein include a heated refractory component including: a core material forming the heated refractory component; a working surface of the heated refractory component; a heating element disposed within the core material; and electrically conductive shielding between the working surface and the heating element, where current leaking from the heating element toward the working surface is substantially absorbed by the shielding. According to some embodiments the heating element is encapsulated within the core material and the shielding is encapsulated within the core material. The heated refractory component of an example embodiment further includes a first conductive lead for the heating element, a second conductive lead for the heating element, and a third conductive lead for the electrically conductive shielding. According to certain embodiments, the second conductive lead for the heating element is in electrical communication with the third conductive lead for the electrically conductive shielding at a circuit powering the heating element.

According to some embodiments, the circuit powering the heating element includes a GFCI (ground fault circuit interrupter), where the current leaking from the heating element is sufficient to trip the GFCI if not returned to the circuit powering the heating element by the third conductive lead for the electrically conductive shielding. The heated refractory component of an example embodiment contacts molten metal, where the molten metal acts as a ground. The electrically conductive shielding of an example embodiment is disposed between the heating element and a non-working surface which will contact molten metal in response to a molten metal leak. The heating element of an example embodiment includes a coiled resistance heating wire.

According to some embodiments, the electrically conductive shielding includes a wire mesh disposed between a working surface of the heated refractory component and the heating element. The electrically conductive shielding of some embodiments includes wire disposed between the working surface and the heating element. According to some embodiments, the heated refractory component includes a trough section extending from a first end of the trough section to a second end of the trough section, the trough section configured to abut at least one additional trough section at the second end, where the electrically conductive shielding extends around the heating element, between the heating element and the second end of the trough section. The heating element of an example embodiment is configured to heat the working surface of the heated refractory component to at least 400 degrees Celsius.

Embodiments provided herein include a method for heating a heated refractory component including: supplying current to a heating element embedded within a core material forming the heated refractory component; and receiving current leaking from the heating element at electrically conductive shielding embedded within the core material, between the heating element and a working surface of the heated refractory component. According to some embodiments, supplying current to a heating element embedded within the core material include supplying current from a circuit protected with a GFCI (ground fault circuit interrupter). The method of some embodiments further includes receiving current leaking to the electrically conductive shielding embedded within the core material at the GFCI. The current leaking to the electrically conductive shielding embedded within the core material prevents the GFCI from tripping due to the current leaking from the heating element. The method of some embodiments further includes heating a working surface of the heated refractory component with the heating element to a temperature of at least 400 degrees Celsius.

Embodiments provided herein include a ceramic component including: a conductor protected by a GFCI (ground fault circuit interrupter); and a shield proximate the conductor, where the shield receives a portion of the current from the conductor and returns the portion of the current received to the GFCI. The shield of an example embodiment returns the portion of the current to the GFCI by way of a neutral conductor. The portion of the current received at the shield of an example embodiment includes current leakage from the conductor, where the current leakage is above an amperage that would result in the GFCI tripping if not returned to the GFCI. The ceramic component of an example embodiment becomes increasingly electrically conductive at temperatures exceeding 400 degrees Celsius. The current leakage resulting from the electrical conductivity at elevated temperatures exceeds 5 mA in some embodiments.

BRIEF DESCRIPTION OF THE DRAWINGS

Figure 1:
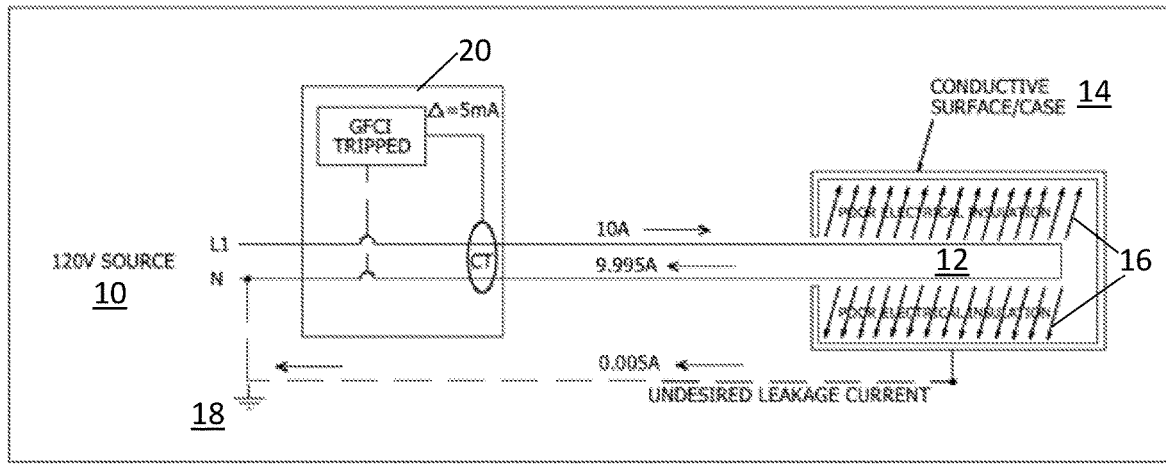
Figure 1:
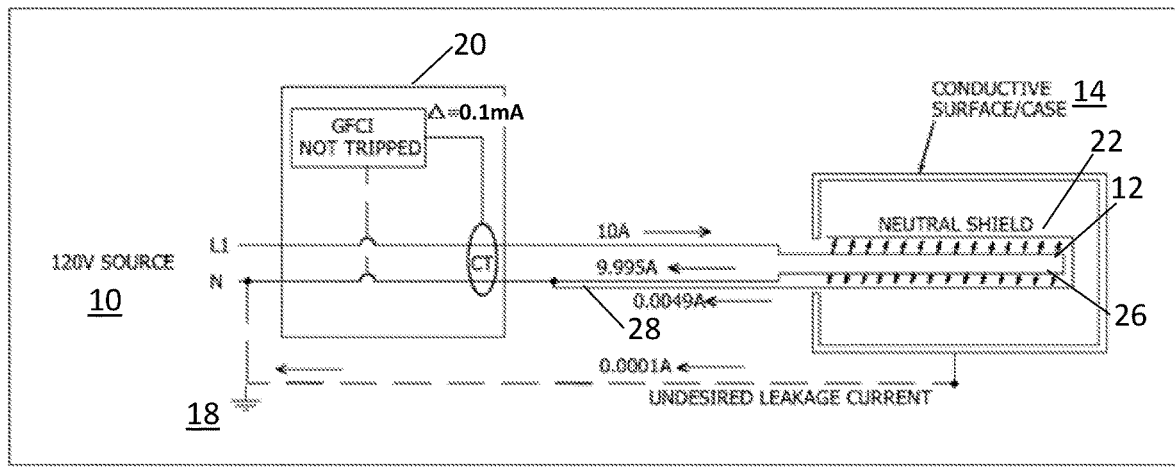
Figure 2:
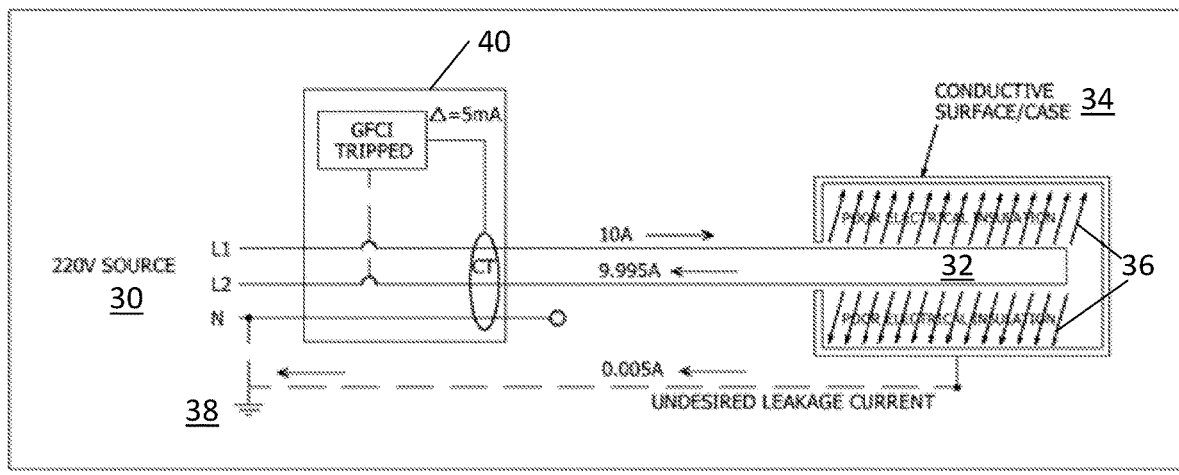
Figure 2:
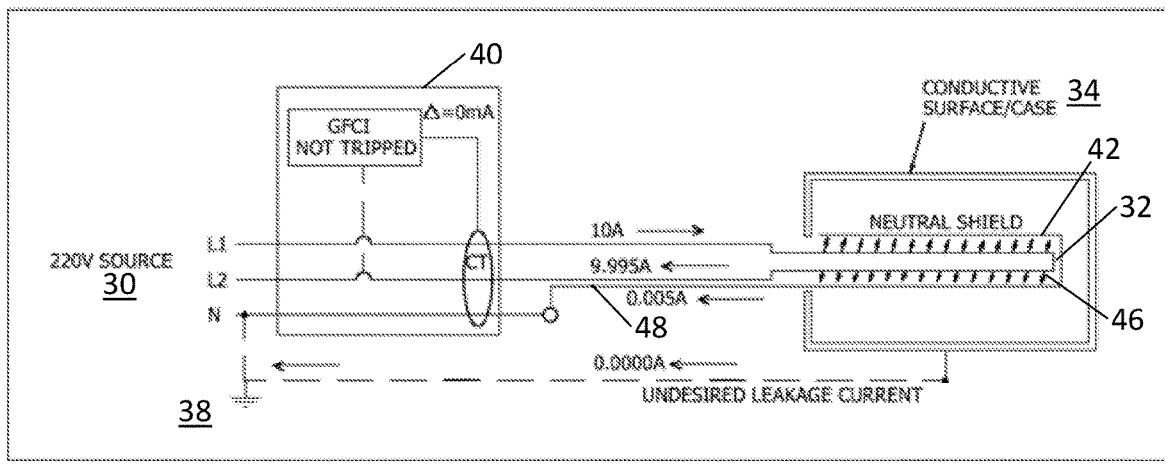
Figure 3:
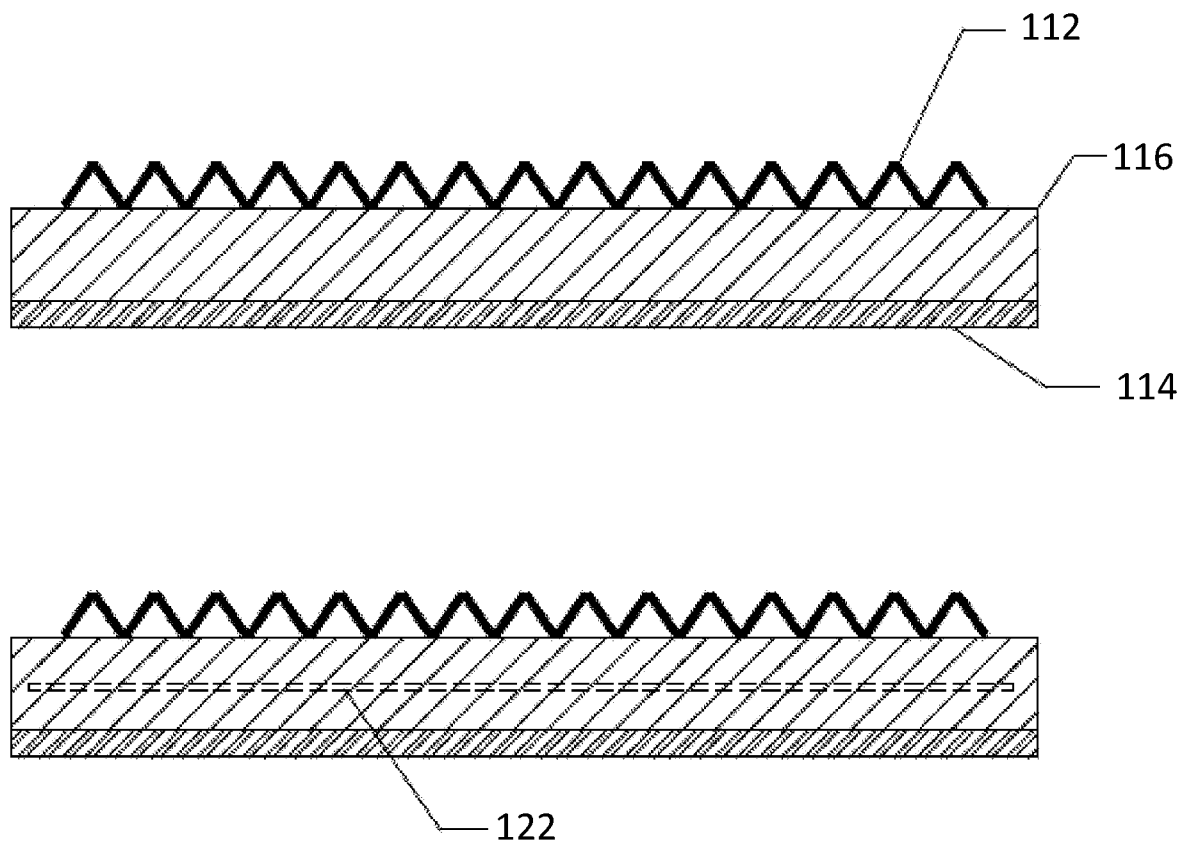
Figure 4:
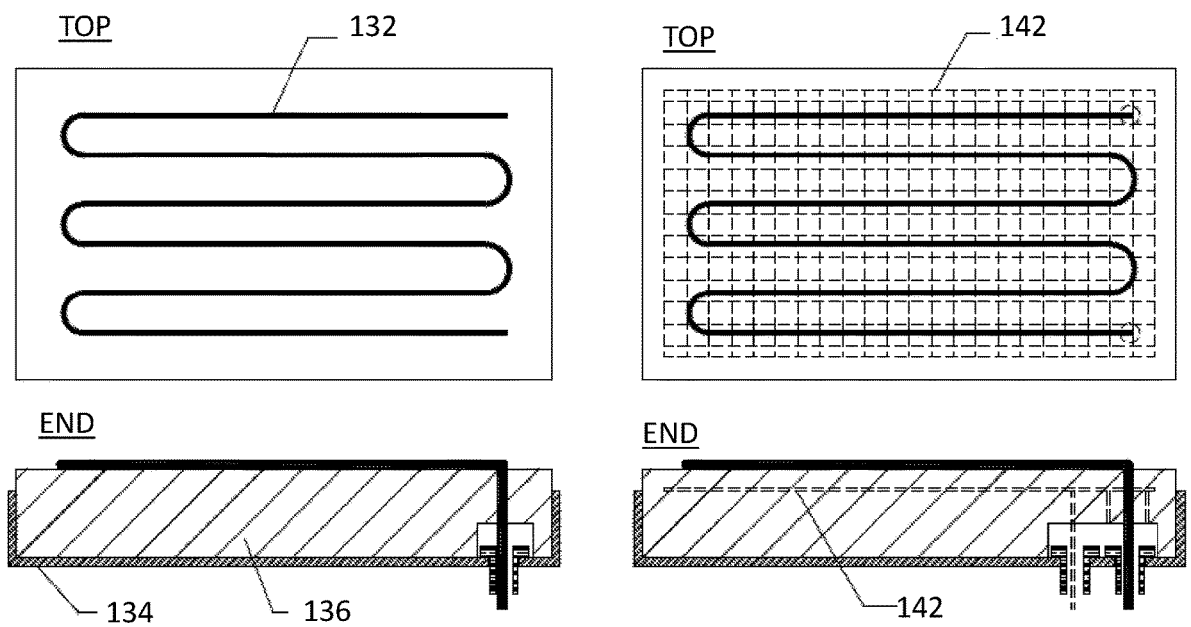
Figure 5:
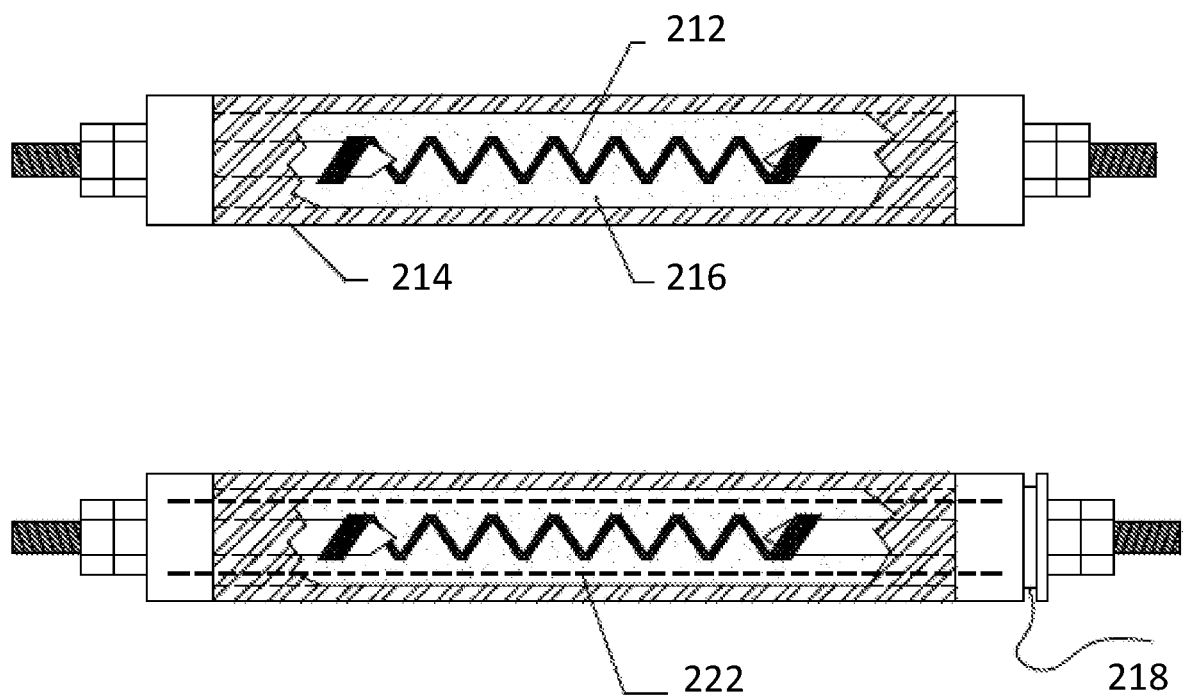
Figure 6:
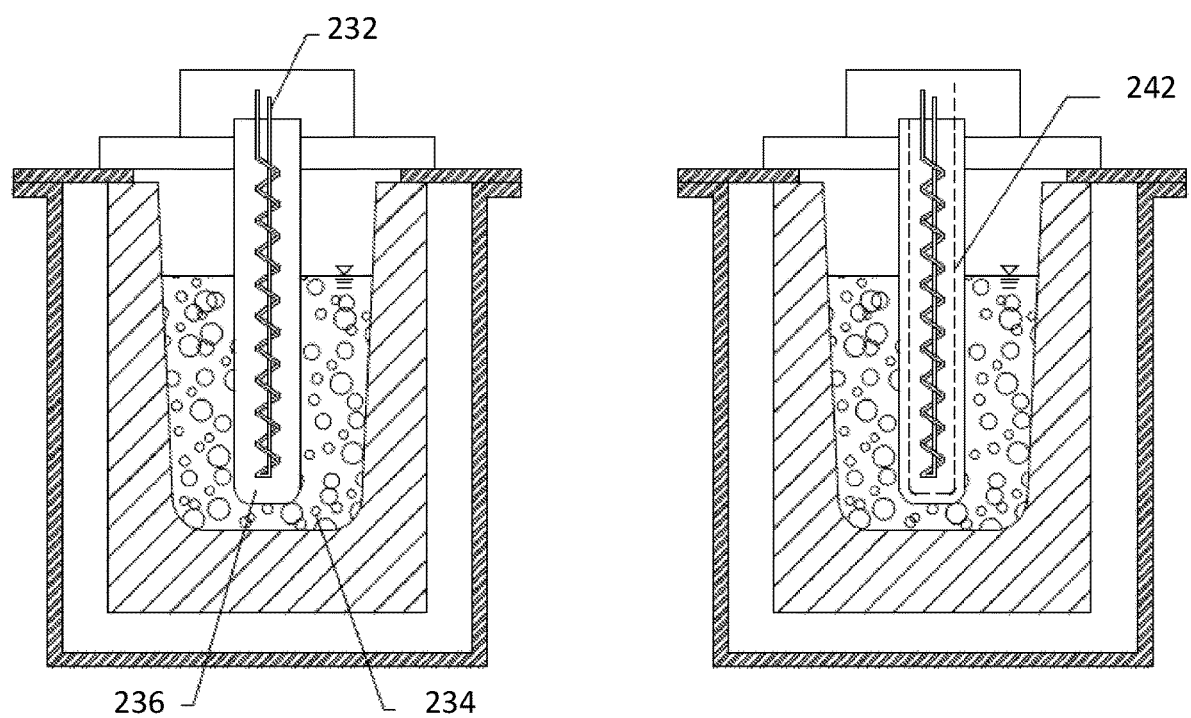
Figure 7:
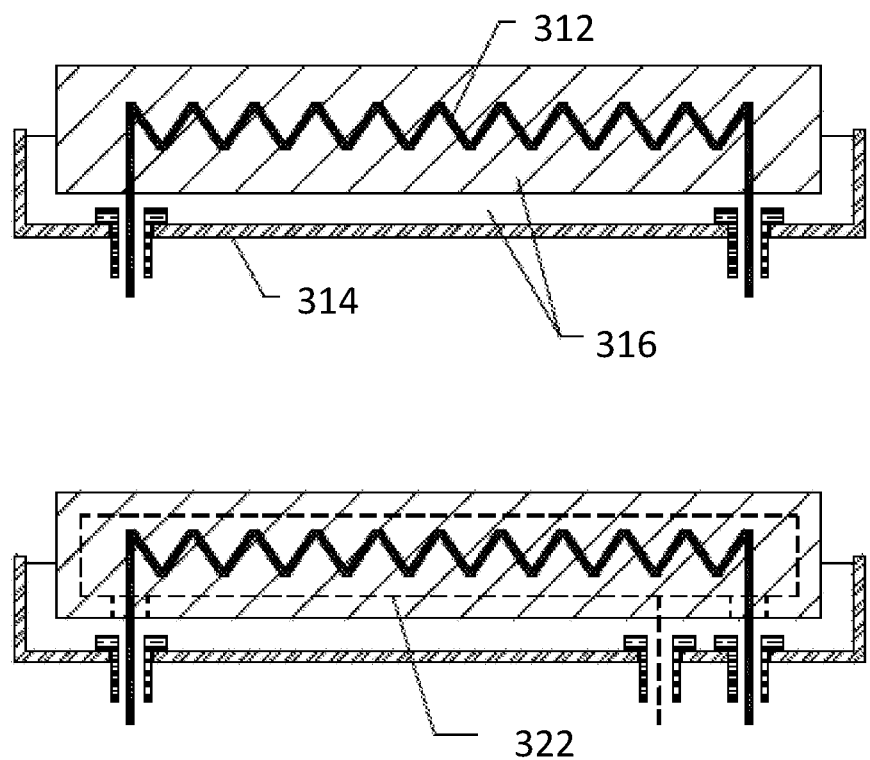
Figure 8:
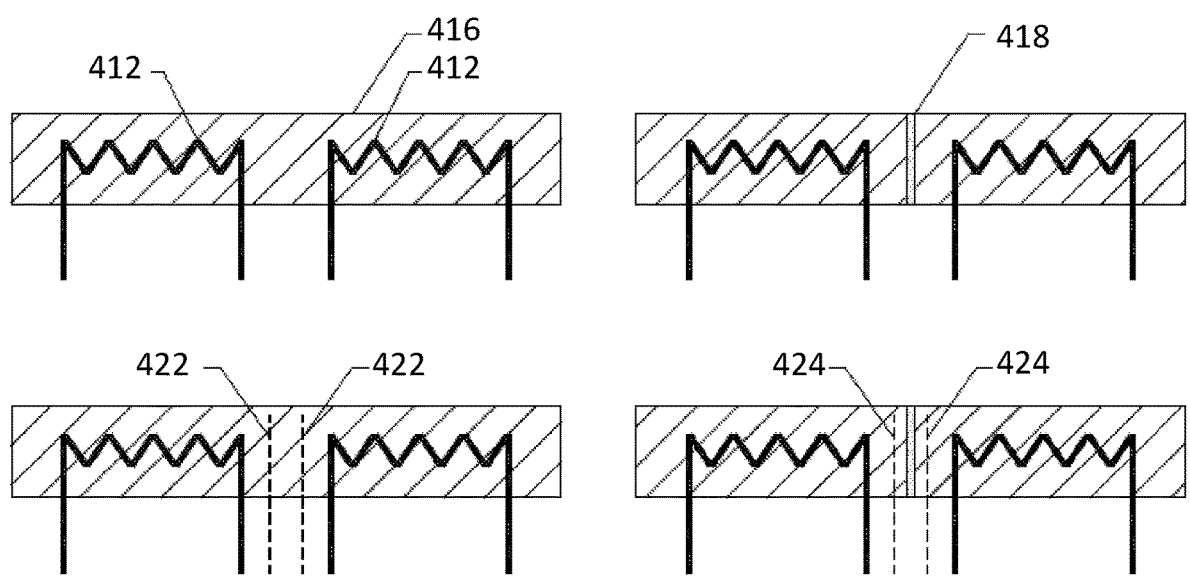
Figure 9:
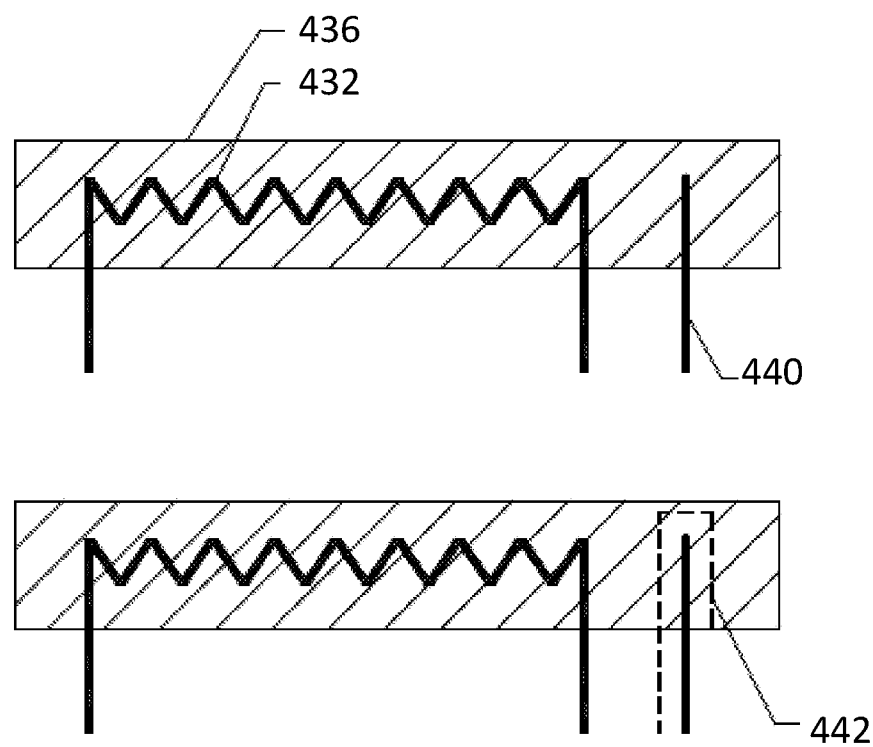
Figure 10:
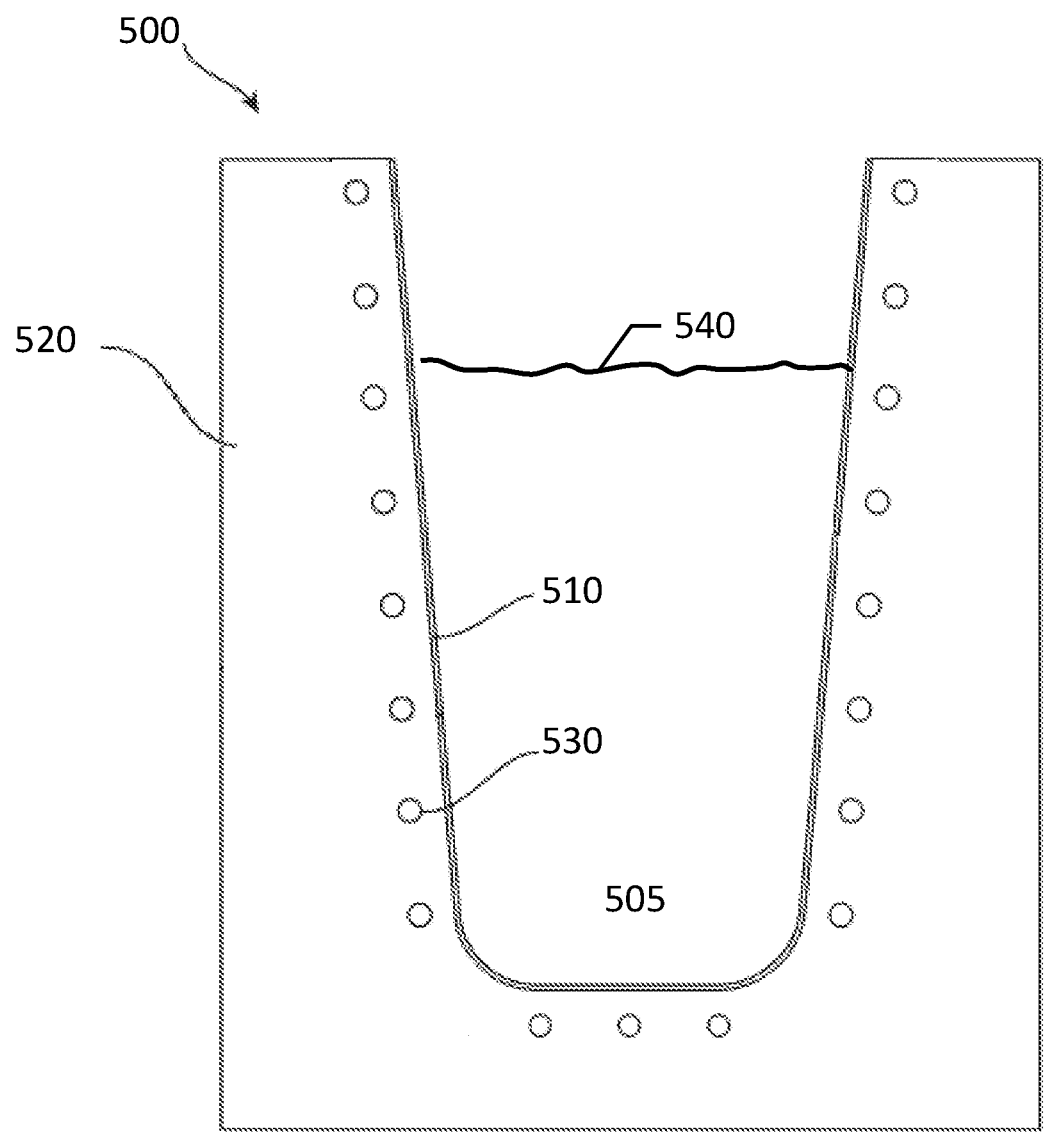
Figure 11:
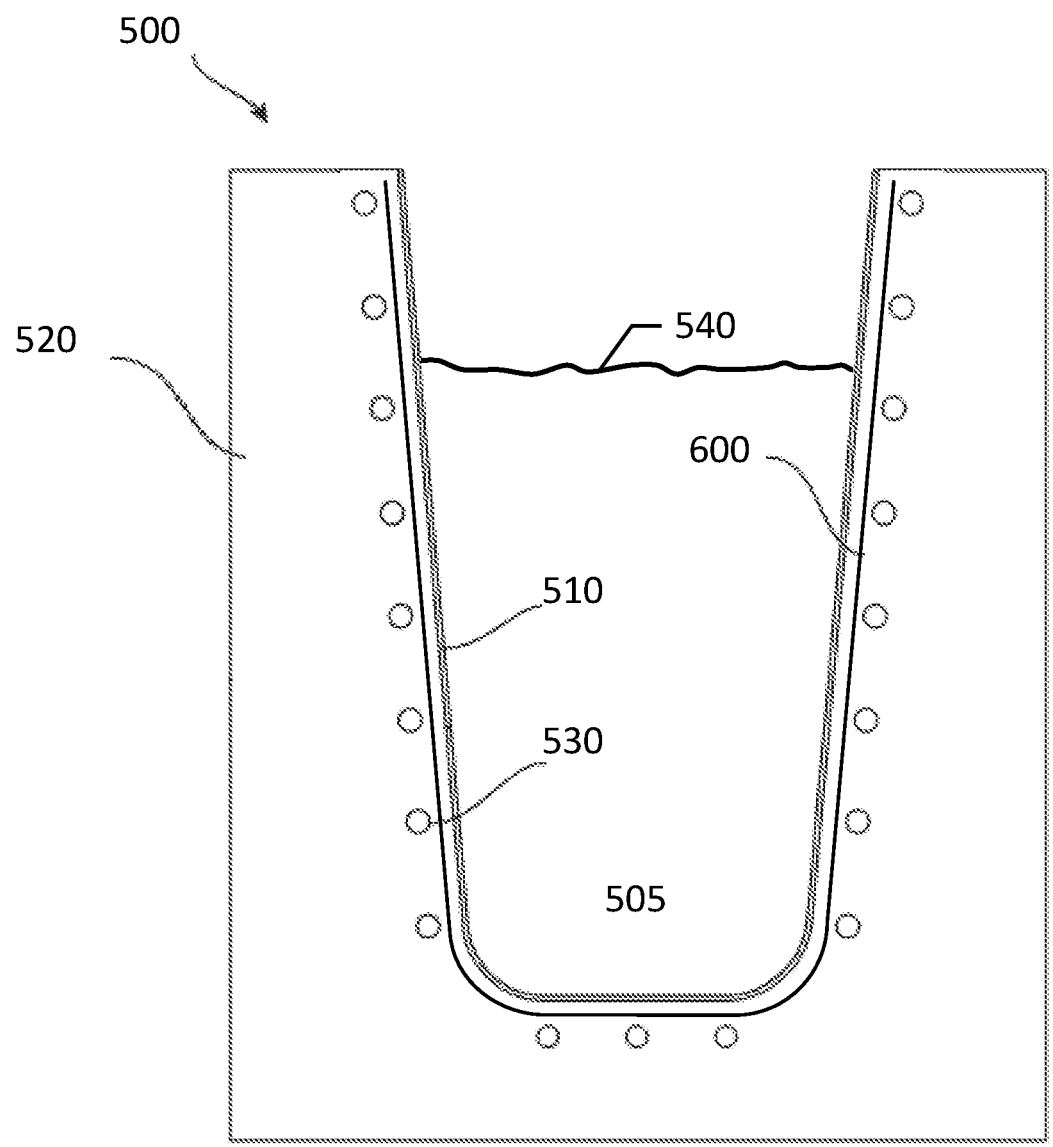
Figure 12:
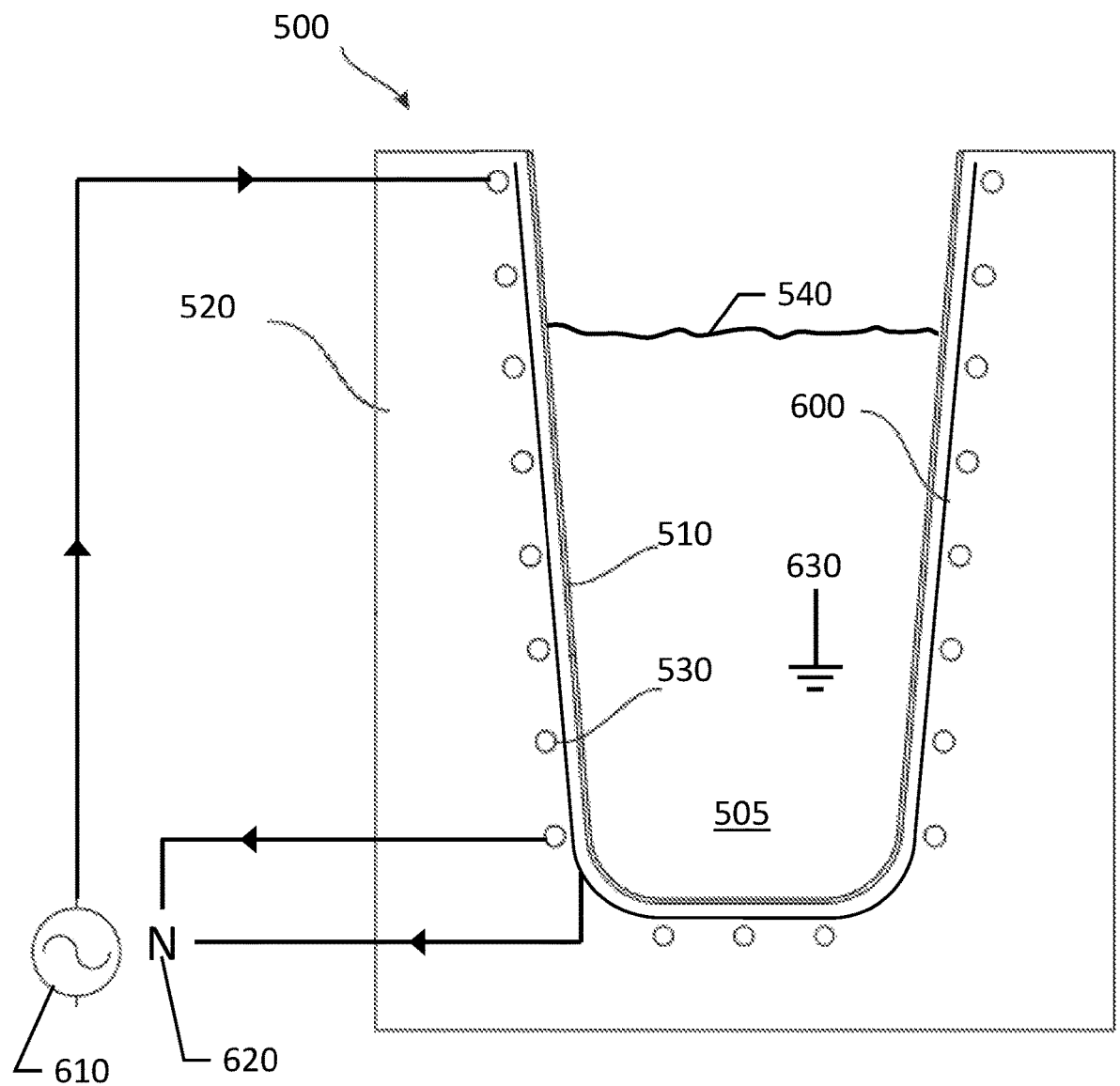
Figure 13:
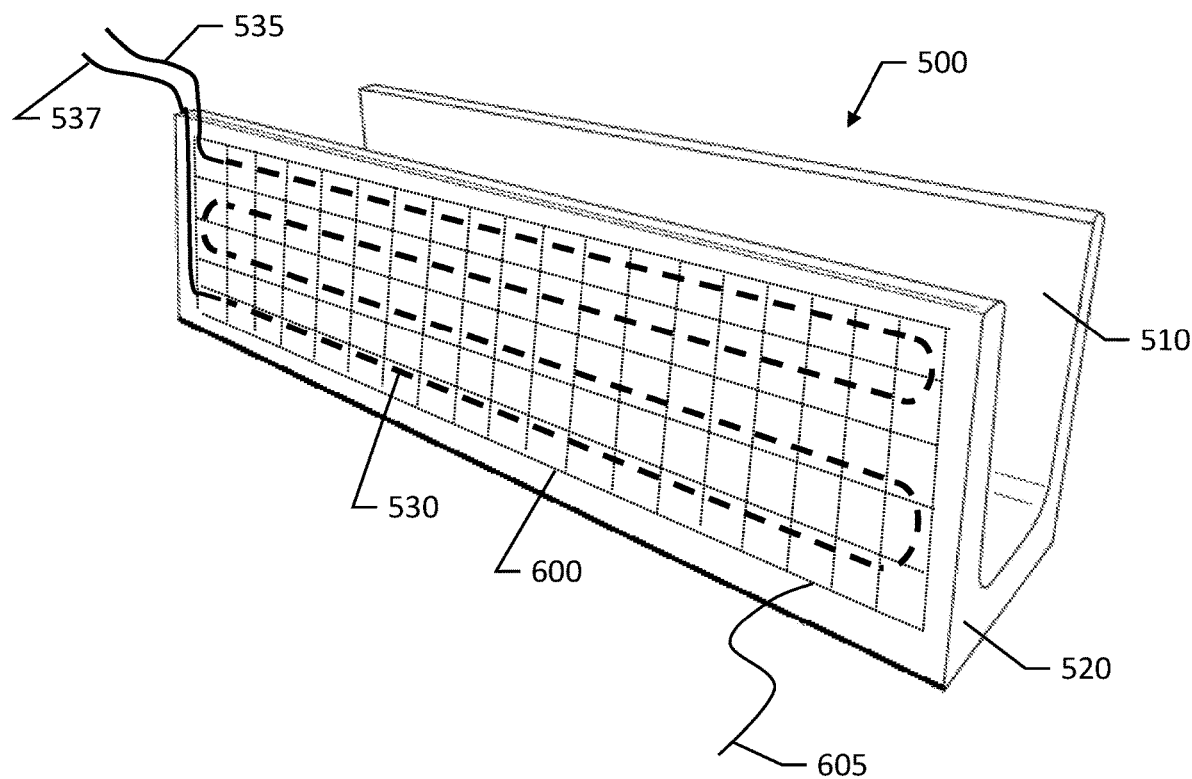
Figure 14:
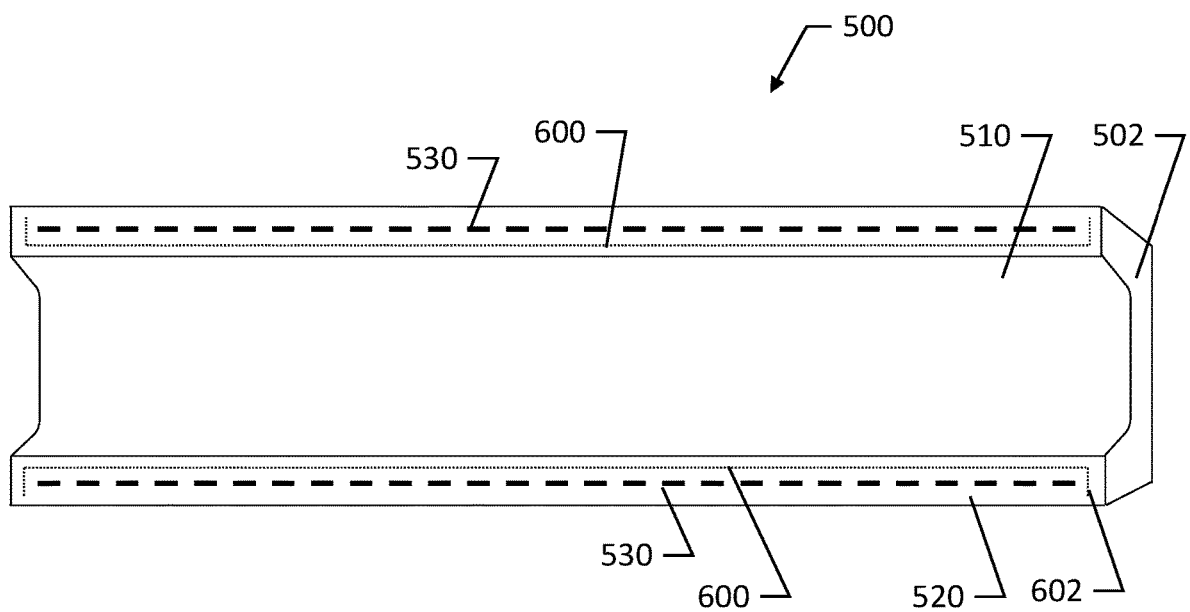

Having thus described the invention in general terms, reference will now be made to the accompanying drawings, which are not necessarily drawn to scale, and wherein:

FIG. 1 illustrates a schematic of an example embodiment of shielded versus unshielded conductors according to an example embodiment of the present disclosure;

FIG. 2 illustrates another schematic of an example embodiment of shielded versus unshielded conductors of a 220-volt circuit according to an example embodiment of the present disclosure;

FIG. 3 illustrates an example embodiment of shielded heating elements in a radiant coil heater according to an example embodiment of the present disclosure;

FIG. 4 illustrates an example embodiment of shielded heating elements in a ceramic fiber heater according to an example embodiment of the present disclosure;

FIG. 5 illustrates an example embodiment of shielded heating elements in a tubular heater or cartridge heater according to an example embodiment of the present disclosure;

FIG. 6 illustrates an example embodiment of shielded heating elements in an immersion heater according to an example embodiment of the present disclosure;

FIG. 7 illustrates an example embodiment of shielded heating elements in a cast-in ceramic heater according to an example embodiment of the present disclosure;

FIG. 8 illustrates an example embodiment of shielded heating elements in a multi-part cast-in ceramic heater according to an example embodiment of the present disclosure;

FIG. 9 illustrates an example embodiment of shielded heating elements in a cast-in ceramic heater having a thermocouple according to an example embodiment of the present disclosure;

FIG. 10 illustrates a heated refractory component that includes a heating element and a working surface that is in contact with molten metal as it flows through a trough according to an example embodiment of the present disclosure;

FIG. 11 illustrates a heated refractory component that includes a working surface that is in contact with molten metal as it flows through a trough and including electrically conductive shielding between the heating element and the working surface according to an example embodiment of the present disclosure;

FIG. 12 illustrates the heated refractory component of FIG. 11 with a general representation of the electrical circuitry according to an example embodiment of the present disclosure;

FIG. 13 illustrates a cutaway view of a heated refractory component including a heating element and electrically conductive shielding according to an example embodiment of the present disclosure;

FIG. 14 illustrates a top view of a heated refractory component including a heating element and electrically conductive shielding according to an example embodiment of the present disclosure.

DETAILED DESCRIPTION

Example embodiments of the present disclosure now will be described more fully hereinafter with reference to the accompanying drawings, in which some, but not all embodiments of the disclosure are shown. Indeed, embodiments may take many different forms and should not be construed as limited to the embodiments set forth herein; rather, these embodiments are provided so that this disclosure will satisfy applicable legal requirements. Like numbers refer to like elements throughout.

Embodiments of the present disclosure generally relate to a system, apparatus, and method for electrically shielding heated components, and more particularly, to electrically shielding electrically heated components in such a way as to be compatible with GFCI (ground fault circuit interrupter). Electrical heating devices are useful in a wide variety of applications. Often, heating devices are configured to direct heat in a particular direction or to bias a heating effect from a heating element toward a particular direction. To do so, thermally insulative materials may be employed to resist heat flow in a direction of the thermally insulative material, while promoting heat transfer in directions that are not insulated, or that have less thermal insulation.

As temperatures of insulative material increase, the properties of the insulative material change. For example, materials that have a binder, salts, or other materials can become increasingly electrically conductive at higher temperatures. As temperatures increase, and the electrical conductivity of the insulative material increases, the propensity for current leakage from the heating element conductor increases. This current leakage can result in what is seen as an imbalanced load on the circuit such that a GFCI will trip and open the circuit. Some materials can be used as the insulative material that have a lower propensity to conduct electricity, even at high temps; however these materials are generally very high purity and can be more costly or more difficult to shape. Embodiments described herein employ a shield to mitigate current leakage from a heating element conductor thereby allowing a circuit powering the heating element conductor to employ a GFCI and use binders such as cement, organic binders, and inorganic binders; and to use additives such as flow agents, aerators, adhesion agents, etc. These binders and additives increase electrical conductivity of the ceramic, especially at elevated temperature, causing leakage current that may trip the GFCI.

FIG. 1 illustrates a schematic of an example embodiment of shielded versus unshielded conductors. The circuit includes a 120-volt source 10. The line voltage is sent at 10-amps to the conductor 12 that his housed within a conductive surface or case 14. In the top illustration of FIG. 1, there exists insulation between the conductor 12 and the conductive surface or case 14. In such an embodiment, current leakage flows from the conductor 12 through the insulation to the conductive surface or case 14 as depicted by arrows 16. The conductive surface or case 14 functions as a ground 18. This leads to the embodiment without shielded conductors having current leakage to ground in the amount of five milliamps (5 mA). For a circuit protected by a GFCI 20, as shown in FIG. 1, current leakage to ground, even in the amount of 5 mA, is sufficient to trip the GFCI as the delta current between the line L1 and the neutral line N is 5 mA.

In the lower illustration of FIG. 1, a shield 22 is placed around the conductor, or at minimum between the conductor 12 and the conductive surface or case 14. Current still leaks from the conductor 12 as found in the unshielded embodiment. However, in the shielded embodiment of FIG. 1, the leaked current shown by arrows 26 is intercepted by the shield 22. The shield 22 returns the leaked current (in the amount of 4.9 mA) back to the neutral line N. The shield does not prevent all current leakage from reaching ground 18, as shown by 0.1 mA flowing along the ground. As the shield 22 returns the leaked current of 4.9 mA back to the neutral line N ahead of the neutral line reaching the GFCI 20, the delta current seen at the GFCI between the line in L1 and the neutral line N is only 0.1 mA, which is insufficient to trip the GFCI and the circuit continues to function properly. The shield 22 of FIG. 1 is a neutral shield; however, as described further below, the shield need not be a neutral line, but could be any line connecting to the GFCI to return leaked current.

FIG. 2 illustrates an example embodiment of a 220-volt circuit with unshielded conductors in the top illustration, and shielded conductors in the bottom illustration. As shown, there is a 220-volt source 30 including two lines in L1 and L2 and neutral line N. The conductor 32 is powered by the line-in voltage of 220-volts from L1 and L2. As shown in the top illustration of FIG. 2, current leakage through insulation is shown by arrows 36. This leaked current reaches ground 38 and flows back to the circuit, shown at 5 mA. This delta current of 5 mA seen at the GFCI causes the GFCI to trip and break the circuit. Conversely, as depicted in the lower illustration, a conductor 32 having a shield 42 receives leaked current shown by arrows 46 at the shield 42. This current is returned to the GFCI along neutral line N. Thus, there is little delta current at the GFCI and the GFCI is not tripped in the embodiment with shielded conductors, and the circuit continues to function normally. As with FIG. 1, the shield 42 of FIG. 2 is a neutral shield; however, any conductor providing leaked current back to the GFCI can be employed.

The above described embodiments of FIG. 1 and FIG. 2 illustrate the benefit of providing a shield (22 and 42) for the conductor (12 and 32). The shielded conductors allow the conductors to be powered with a circuit that includes a GFCI to improve the safety of the circuit. In practice, embodiments of the shielded conductor can be employed in a wide variety of applications.

An example of such an electrical heating device is a radiant coil heater used to heat a space—sometimes referred to as a space heater or type thereof. Radiant coil heaters are generally configured to use an electrical heating element including a resistive heating wire to generate heat from supplied electricity. The heat is emitted from such electrical heating elements in all directions; however, the heater is generally used to heat in a particular direction. To do so, heat shielding may be employed in the form of a metal collector to help reflect heat in the desired direction. As the metal will absorb heat to some degree, insulation may be used behind the heat shielding to help mitigate heat flow in the undesired direction.

FIG. 3 illustrates an example schematic of a portion of a radiant coil heater including a heating coil in the form of conductor 112 with insulation 116 backing, and a housing 114 that is grounded. The housing 114 can include the structure forming the heater, while the insulation 116 insulates the housing from the heating element conductor 112. The insulation promotes heat expulsion from the heating coil in a desired direction. However, current leakage can occur between the conductor 112 and the housing 114. The lower illustration of FIG. 3 includes a shield 122 disposed between the conductor 112 and the housing 114. This shield functions as depicted in FIG. 1 and FIG. 2 to return leaked current to the GFCI, such as via the neutral line of a circuit, thereby enabling the circuit to be protected using a GFCI without interruption due to inadvertent current leakage.

FIG. 4 illustrates another example embodiment of a ceramic fiber heater. The left side of FIG. 4 depicts an unshielded heater, while the right side depicts a shielded heater. The unshielded embodiment includes heating element conductor 132 with ceramic fiber insulation 136 between a housing 134 (ground) and the conductor. As shown, in the shielded embodiment, a shield 142 is embedded within the ceramic fiber insulation 136 and configured to intercept current leakage from the heating element conductor 132 before it reaches the housing 134 and leaks to ground. This enables the shielded ceramic fiber heater to be powered by a circuit including a GFCI without improper interruption.

FIG. 5 illustrates a tubular heater or cartridge heater including an unshielded embodiment shown above a shielded embodiment. Cartridge heaters are often used for heating dies, molds, platens, and other parts through insertion of the cartridge heater into a bored hole. Further, cartridge heaters can be used in liquid immersion applications. The illustrated embodiment includes a heating element conductor 212 within a housing 214 that is grounded. Insulation 216 separates the conductor 212 from the housing 214. The shielded embodiment includes a shield 222 between the heating element conductor 212 and the housing 214, with neutral lead 218 feeding leaked current from the conductor back to the circuit such that it can be protected by a GFCI without unnecessary interruption.

FIG. 6 illustrates an example embodiment of an immersion heater with an unshielded embodiment on the left side and a shielded embodiment on the right. As shown, the conductor 232 is submerged in liquid 234 that is grounded. The liquid may be molten metal. The body 236 of the immersion heater functions as the insulator from the liquid 234. A shield 242 can protect current leaking from the heating element conductor 232 to the liquid 234 (ground). The shield, as with embodiments above, returns leaked current to the neutral line of a circuit such that a GFCI can be employed on the circuit.

FIG. 7 illustrates an example embodiment of a shielded heated component in the form of a cast-in ceramic heater. As illustrated, an unshielded embodiment is shown atop a shielded embodiment. The heating element conductor 312 is embedded within ceramic, where the ceramic and insulation between the ceramic and the housing 314 function as insulators 316 from the housing 314. Leakage current through the ceramic and insulation can be enough to trip a GFCI. The shielded embodiment employs a shield 322 within the ceramic about the heating element conductor 312. This shield allows current to leak from the conductor and be returned to the neutral line of the circuit to avoid unnecessary tripping of the GFCI.

In addition to current leakage from a conductor to ground, in embodiments in which heating element conductors may be close to one another. For example, as described further below, heated refractory components may be disposed proximate one another, particularly where the heated refractory components are trough sections. FIG. 8 illustrates two types of unshielded configurations on the top of the figure, and those types of configurations shielded at the bottom of the figure. As shown, the heating element conductors 412 are embedded within a medium 416, such as an insulation or refractory component. In some cases, the conductors may be embedded within the same medium. In other cases, the conductors may be in separate components with a joint 418 there between.

As shown in FIG. 8, the current can leak between the conductors 412 in the unshielded embodiments. The leakage can be problematic particularly when the conductors are on individual circuits. In such an embodiment, one circuit may see a drop in the return current while another sees an increase. The direction of the current leakage may be driven, for example, by the electrical potential difference between the conductors 412. Embodiments described herein provide a shield between the conductors to capture leaked current and return that current to the GFCI, such as through a neutral line of the circuit. The shield 422 can be disposed proximate each conductor, between the conductors. A shield is required for each circuit, such that if the two conductors are powered by different circuits, a shield for each conductor is needed for proper functionality. Similarly, with separate components, the shield 424 elements can be disposed on opposite sides of the joint 418 to capture leaked current from each respective conductor.

The shielding for heated components described herein can also be used to mitigate current leakage from a conductor to other components. For example, many heaters include thermocouples for temperature control and to avoid overheating. FIG. 9 illustrates an example embodiment of a heated component with an unshielded version shown above a shielded version. As illustrated, the conductor 432 is embedded within an insulating material 436, such as a refractory component. The thermocouple 440 is embedded proximate the conductor 432 to measure a temperature of the material as it is heated. Current can leak from the conductor 432 to the thermocouple significantly enough to trip a GFCI through which the conductor is powered. To mitigate this, the thermocouple can be shielded with shield 442, where the leaked current can be returned to the GFCI of the circuit to avoid tripping the GFCI.

Further embodiments disclosed herein relate to a specific use case for heated refractory components in a casting operation. A system, apparatus, and method are disclosed herein for producing refractory products, and more particularly, to producing heated refractories, transition plates, moldable refractories, and accessories such as heated spouts, heated pins, thimbles, and dams. Embodiments employ electrically conductive shielding to preclude current leakage from electrical heating elements into the molten metal conveyed by the various refractory components. While the remaining figures and disclosure focus on an exemplary embodiment implemented as a refractory channel or trough, embodiments may be implemented in various other forms of heated components as described above. As such, the embodiment described hereinafter should be illustrative of the structure of heated refractory components and not limiting to those illustrated in the figures.

Metal products may be formed in a variety of ways; however numerous forming methods first require an ingot, billet, or other cast part that can serve as the raw material from which a metal end product can be manufactured, such as through rolling, extrusion, or machining, for example. One method of manufacturing an ingot or billet is through a continuous casting process known as direct chill casting, whereby a vertically oriented mold cavity is situated above a platform that translates vertically down into a casting pit. A starter block may be situated on the platform and form a bottom of the mold cavity, at least initially, to begin the casting process. Direct chill casting may be performed with multiple mold cavities whereby molten metal is distributed to the various mold cavities. Problematically, molten metal introduced at one side of an array of mold cavities cools to different temperatures by the time it reaches mold cavities further from the molten metal source. Molten metal is supplied to the mold cavities using a refractory channels, where channels are formed of a refractory material that is resistant to heat and reduces the heat loss of the molten metal as it travels along the refractory channel due to the properties of the refractory material. However, heat loss of the molten metal may still be significant, particularly across a mold frame having a plurality of mold cavities. Further, metal temperatures drop from the furnace to the table in the furnace launder. These furnace launders that carry molten metal from the furnace to the billet table may be on the order of 100 feet in some cases.

Temperature variation between the furnace and the various billet mold cavities presents problems. Temperature variance often occurs over the duration of the cast, where the refractory is initially cold, but heats up as the cast progresses such that the metal initially loses a substantial amount of heat to the refractory. Toward the end of the casting process, the refractory has been heated by the heat removed from the metal such that less heat is lost from the metal, resulting in temperature variation of the temperature of the metal at the molds during the casting process. Temperature also varies from one cast to another. The refractory may have residual heat at the start of a second casting operation such that the temperatures will be different from the first casting operation. Temperature of the molten metal tends to drop as heat is lost from the metal without compensatory heat. Temperature variance can be on the order of 50° C. from the furnace launder, which is detrimental to casting. The error in the temperature itself can be harmful as is the variability of that error.

Molten metal is supplied to the mold cavities through one or more refractory channels and is distributed to the mold cavity whereupon the molten metal cools, typically using a cooling fluid. The platform with the starter block thereon may descend into the casting pit at a predefined speed to allow the metal exiting the mold cavity and descending with the starter block to solidify. The platform continues to be lowered as more molten metal enters the mold cavity, and solid metal exits the mold cavity. This continuous casting process allows metal ingots and billets to be formed according to the profile of the mold cavity and having a length limited only by the casting pit depth and the hydraulically actuated platform moving therein.

Casting operations for casting metals typically involve the transport of molten metal from a furnace to molds. For example, in direct chill casting, a mold table may include an array of billet molds where numerous billet casting molds may be arranged within a mold table. The introduction of molten metal to each of the casting molds involves transporting the molten metal from the furnace to each mold cavity. The molten metal is generally introduced first at one side of a mold table, and flows along refractory channels to reach each mold cavity. However, the molten metal temperature varies across the refractory channels across the mold table as the molten metal cools relatively rapidly as it flows along the refractory channels, despite the refractory material of the channels insulating the molten metal. This temperature variation across distribution points of a casting operation can be detrimental to the casting process.

Metal temperature control is a key functional requirement of a refractory channel or refractory system. Ideally, molten metal temperature would remain constant from the furnace all the way to the mold where it will eventually cool and solidify. Minimal temperature drop is desirable. However, real-world refractory channels absorb some heat from the molten metal and cools the metal. This heat loss can be compensated for with increased furnace temperatures; however this could degrade the quality of the casting and increase cost, while still having variability in the molten metal temperature across the plurality of molds.

Embodiments provided herein include refractory channels, systems, and products that minimize or eliminate temperature loss in molten metal as it is transported to mold cavities. Embodiments further shield the electrical heating elements from the molten metal carried by the refractory components such that current drain to the molten metal is minimized or eliminated. An example described herein includes an internally heated refractory material. Embodiments may include electric heating elements integrated within the refractory material that handles molten aluminum. The internal, embedded heating elements allow precise temperature control of the refractory material where the refractory material can be preheated to avoid sudden temperature drop in molten metal when it is first introduced to the refractory material, such as into a refractory channel or trough. Further, the refractory material can be heated for steady-state molten metal flow through or around a refractory channel or accessory (e.g., thimble, spout, etc.). Further, the refractory material can be heated and immersed within a stagnant metal bath, or the heated refractory may be configured as a bowl to contain a stagnant molten metal bath. Heat may be continually applied to the refractory material to compensate for losses from convection and radiation. Embodiments described herein offer greater control of material temperature and consistency than with passive (non-heated) refractory shapes.

Electrical heating elements can suffer from drawbacks, such as cracking that disables the heating element through a loss of conductivity. The electrical heating elements of example embodiments embedded within the refractory further benefit from the structural reinforcement of the refractory material to help avoid movement and potential cracking or breakage of the heating element, thereby improving the lifespan of the heating elements. Further, heating elements embedded within the refractory material can be positioned closer to a working surface of the refractory, requiring less heat to be provided by the heating elements, thereby improving the lifespan of the heating elements.

FIG. 10 illustrates an example embodiment of a refractory component 500 that includes a working surface 510 that is in contact with molten metal as it flows through the trough 505. The refractory channel further includes a core 520 that is of refractory material proximate the working surface. Electric heating elements 530 may be disposed within the core 520. The electric heating elements 530 may be of a variety of configurations, such as a resistive heating element wire (e.g., nichrome wire). The refractory component 500 may be installed within an insulated steel frame in some embodiments adjacent to additional heated refractory components to form a structure for conveying molten metal to a casting mold.

The heating element 530 of an example embodiments includes a heating element wire. The resistive heating element wire may be of a variety of wire gages, such as between 34 gage and 14 gage, which may be selected based upon a pattern and density of the wire within the core 520. For example, a relatively thinner gage wire can be wound into coils, such as coils of between about 0.2" and 0.5" in diameter, and the coils can be wound within the core to sufficiently heat the working surface 510 of the heated refractory. The wire gage, coil diameter, and density of the coils within the core can be selected based on a desired power consumption of the heating elements, and a desired temperature of the working surface of the heated refractory. According to some embodiments, each heated refractory component may maintain a total power consumption below a predetermined level, such as below 12 amps, or below 16 amps, such that the heated refractory components can be powered by standard 15 amp or 20 amp circuits at 120-volts or 240-volts. These circuits are generally protected by ground fault circuit interrupters (GFCI) given the environment in which casting is performed.

The electric heating element of example embodiments applies heat to the working surface 510. In this manner, the molten metal temperature of molten metal flowing through the heated refractory component 500 is held constant within the channel. The heating element 530 of an example embodiment is a resistance heating wire, which may be nickel or iron alloys known to the industry. The coiled configuration of the wire described above aids in shaping the element and adds more physical length to the wire to increase the total resistance while delivering sufficient heat over the heated area of the heated refractory component.

According to some embodiments, a heated refractory component 500 may be made with resistance heating wire that does not have coils. Such an element requires less overall thickness which can improve thermal performance. However, the straight wire is more difficult to fabricate. A coil form for the heating element 530 is generally preferable due to the ability to stretch allowing another degree of freedom in the design and installation process resulting in a greater degree of standardization. The same coiled element may be employed in most heated refractory components (e.g., channels) on a project and stretched to different pitch for each unique part. The heating elements 530 of example embodiments may be designed for a given power density. Power densities between 1 to 10 watts per square inch are common to the industry. High power densities such as 20 watts per square inch are also known.

The heating element 530 may be controlled with a loop controller and switch. The feedback may be a type K thermocouple. The thermocouple measures the temperature of the refractory or the metal or the air proximate to the refractory. Controlling the element temperature may be useful to protect from overheating and to stabilize the system to avoid over/under-shooting the desired temperature. Embodiments may be designed to run at low power without any temperature control. The design and configuration could prohibit overheating such that the feedback loop may be rendered unnecessary.

Embodiments described herein are designed to heat the working surface 510 of a refractory component 500 with the disclosed heating system. It is desirable to have a temperature of the working surface 510 within a predefined degree of similarity of the molten metal that is to flow through the trough 105 such that there is no heat transfer between the working surface 510 and the molten metal flowing through the component 500. This predefined degree of similarity may be a temperature range or a percentage, such as a degree of similarity of five percent, two percent, or even one percent. Optionally, the working surface 510 temperature may be maintained a predetermined amount above the temperature of the molten metal to compensate for heat lost from the molten metal through convection and radiation. The working surface 510 of example embodiments is a relatively hard material that is not susceptible to damage from steel cleaning tools such as steel brushes and scrapers. Further, the working surface 510 may be relatively smooth to avoid molten metal adhering to surface imperfections or roughness. A smooth working surface 510 aids in cleaning after casting. According to some embodiments, the working surface may be treated with a hardening coating. Further, a coating of boron nitride or other release agent may be painted on the working surface 510 to render the surface non-wetting to aluminum.

The core 520 of the refractory channel of example embodiments described herein is of a material strong enough to resist steel cleaning tools including prying and impact forces. Material density varies with application. Lightweight insulating materials are used with low powered heating elements, and high density or thermally conductive materials are used with high powered heating elements. The material must be matched to the heating element to absorb the heat without overheating the element. Generally high density material offer improved strength, durability, and service life. Generally low density materials offer superior thermal performance and require less power to heat. Many additives are known to improve strength such as fibers and admixes.

The heated refractory component 500 of some embodiments can employ insulation surrounding the refractory component to help reach and maintain high temperatures while also insulating a refractory frame (e.g., a metal trough frame) from the heated refractory component. A frame supporting the refractory component 500 may be insulated from the channel by an insulation such as a half-inch thick microporous insulation or fiber insulation or equivalent. Thicker insulation improves thermal performance. The working surface 510 of example embodiments is covered with a material that inhibits convection and radiation heat transfer. In the absence of proper insulation, the system may not achieve the high temperatures needed for optimum results or the system may require more heating power to achieve the objective. While a steel frame for supporting the refractory component 500 may be used, a cover may be omitted from the refractory channel. For example, on a direct chill casting table with a plurality of billet mold cavities, clear visibility to the billet mold cavities may be more important than maximizing a preheat or maintaining heat of a refractory channel. In the absence of a cover, the working surface 510 may achieve a temperature of 400 degrees Celsius or greater where molten aluminum is approximately 700 degrees Celsius. Despite the temperature difference, a pre-heat of 400 degrees Celsius is valuable and directly beneath the working surface the core 520 could be heat soaked to a much higher average temperature, closer to 700 degrees Celsius, such that the bulk of the refractory component 500 is near the metal temperature to improve casting consistency. Embodiments may use an engineered cover over the refractory channels to omit a temperature controller and run full-power with a low-power configuration. For example, a low-powered trough could be designed to run continuously at one watt per-square-inch without any cover so that the internal temperature never overheats.

An integrally heated refractory channel as described herein is configured to preheat the refractory and working surface relatively quickly and with relatively low power consumption based on the design and configuration described above. Embodiments hold the working surface 510 at or near the metal temperature. A heated refractory component 500 of example embodiments may include a working surface heated to a metal temperature of 700 degrees Celsius. The preheat may be relatively quick and require relatively low power due to the heat being directed to the working surface through the construction of the channel and the casting consistency would be improved since heat is not being transferred from the molten metal to the heated refractory channel or vice versa.

According to example embodiments described herein, the working surface 510 is heated by a heating element 530 configured at a proper relative position. The distance between the heating element and the working surface may correspond to the thermal resistance to the objective and the thermal mass of the objective. As the heating element 530 position is closer to the working surface 510, the thermal resistance and the thermal load are reduced which benefits the heating performance. By installing the heating element 530 within the core 520, the heating element is thermally coupled to the working surface 510. This improves heating performance compared with alternate configurations, for example if the heating element was installed within a separate body adjacent to the core. However, the heating element 530 also becomes electrically coupled to the working surface 510 and other ground paths which promotes undesirable leakage current. Installing the heating element 530 within the core 520 benefits heating performance at the expense of promoting leakage current. It is desirable to move the heating element 530 in ever closer proximity to the working surface 510 to improve thermal performance, but this heightens the need to control leakage current.

Heated refractory can be configured into various shapes for various functions with molten metal. For example, the refractory can be configured as a probe immersed into a metal bath or channel to heat the surrounding metal. The refractory can be shaped as a pin and spout controlling metal flow rate, where the heat prevents metal freezing and promotes low metal viscosity for reliable flow. The refractory can be configured as a bowl to hold stagnant molten metal or to pass metal through a filter.

As noted above, the heating element 530 of example embodiments can be powered by conventional alternating current power. Further, for safety, the circuit on which the heating element operates may include a ground fault circuit interrupter (GFCI). GFCIs operate by monitoring the net flow of all conductors including power lines and neutral lines. If there is an imbalance, such as if the powered load allows a hot wire to lose current to a ground, the GFCI senses the mismatch and trips the circuit, disabling the hot wires at the GFCI protecting the circuit, the load, and any people in the vicinity. GFCIs can trip with very small mismatches in current flow between the conductors, such that current losses from a load will cause the GFCI to trip, even if the current loss is not a dangerous situation.

Heated refractory components as described herein employ electrical heating elements 530 proximate the working surface 510 as shown in FIG. 10. Further, the heated refractory components are configured to carry or conduct molten metal 540 along the working surface. The proximity of the electrical heating element to the substantial volume of metal flowing through the heated refractory component can lead to current loss from the heating element 530 into the molten metal 540. The current loss may not be substantial or significant (i.e., less than 0.1 amps); however, this current loss would be seen by a GFCI as a safety hazard, and the GFCI powering the electrical heating element 530 as the load will break the circuit. Embodiments described herein mitigate this issue through electrical shielding of the molten metal 540 from the heating element 530.

FIG. 11 illustrates an example embodiment of a heated refractory component 500 that employs electrically conductive shielding, herein after "shielding" 600 between the heating elements 530 and the working surface 510. The shielding prevents or minimizes the current loss from the heating elements 530 to the molten metal 540 or other ground paths such that a GFCI can be employed without unnecessary tripping. FIG. 12 illustrates the embodiment of FIG. 11 with the addition of a simplified circuit diagram components. The power (e.g., 110/120-volts A/C, 220/240-volts A/C, etc.) is supplied to the electrical heating element 530. The shielding functions to intercept the current loss and return the current loss to the neutral line, thereby rectifying the circuit and precluding an unnecessary tripping of the GFCI protected circuit. Some heating element configurations return current of the heating element on the Neutral line. In this case the shield and the element may share the Neutral line. Some element configurations do not employ a neutral line but the current passes from one line to another or to multiple lines. In this case the shield does not share a neutral with the element. It is necessary that all the conductors of the circuit including lines and neutrals from the element and shield return to the GFCI so that the total net flow of current is balanced.

In the event of a crack in the core 520 of the heated refractory component, the molten metal, acting as a ground, would reach the shielding 600, thereby drawing current and tripping the GFCI. The shield must be designed to be protected from the molten metal so that it does not make contact with the molten metal because that would trip the GFCI. The shielding 600 is configured to be relatively isolated from the heating elements 530 to minimize the current draw to the shielding from the heating elements.

FIG. 13 illustrates an example embodiment of the heated refractory component 500 with the heating element 530 embedded within the core 520 and the shielding 600 embedded in the core between the heating element and the working surface 510. The heating element is shown in relatively thicker dashed lines, while the shielding is shown in relatively lighter dotted lines. The heating element 530 of the illustrated embodiment is shown as an element that snakes through the core 520 as a continuous coil of heated wire. However, embodiments can employ a series of individual heating wires extending linearly along the heated refractory component and joined in series at either end. The heating element 530 is embedded within the core 520, with conductors 534 and 537 extending outside of the core. The shielding 200 is similarly embedded within the core 520, with neutral lead 605 extending from the core.

The embedding of the heating element 530 and the shielding 600 within the core isolates the respective components from ground and protects the components from damage. Further, the embedding of the components within the core 520 promotes heat transfer from the heating elements 530 to the working surface 510. The shielding 600, in addition to extending between the heating elements 530 and the working surface 510 can extend around the ends of the heating elements, between the end of the heated refractory component 500 and the heating element. This shielding further promotes electrical isolation of the heating element from neighboring heated refractory components and thereby limits current loss from the heating element. FIG. 14 illustrates a top view of a heated refractory component 500 in the form of a trough section, where the shielding 600 extends around an end of the heating element 530 shown at 602. As troughs sections are generally used to abut one another, such as at component end 502, the shielding extending around the end of the heating element, between heated refractory components, aids in mitigating current loss between heated refractory components.

The shielding can be configured to protect from other ground paths such as thermocouple sheaths, mounting screws, steel frames, or other conductive ground paths. The shielding can be configured to protect future anticipated ground paths; for example, refractory troughing joints commonly fail and leak molten metal behind and beneath the troughing. The shield can be installed at the bottom and back faces to shield in anticipation of this failure condition. The shielding can be installed to completely encase the heating element and conductors on all sides to shield from unforeseen ground paths in all directions.

T The shielding 600 is illustrated in FIG. 13 as a mesh. This mesh can be a conductive material, such as stainless steel, nichrome, or other metallic mesh that would absorb current that is lost from the heating element. While illustrated as a mesh, the shielding can be configured in a variety of ways and have a similar functional effect. For example, the shielding can be a coil arranged in a common pattern as the heating element but lying between the heating element and the ground. For example, the shielding can be a series of parallel wires electrically connected to one another and to the neutral shielding lead. The shielding can optionally surround the heating element while insulated from the heating elements.

Various materials may be used in example embodiments of refractories, where the materials may include a silica based refractory that has low thermal expansion, compatibility with molten metals such as aluminum, thermal conductivity in the range of one watt per meter Kelvin (1 W/m-K), adequate temperature capacity and strength, and is widely available and affordable. The low thermal expansion renders the material thermally stable and resistant to temperature cracking. The natural thermal conductivity desired is to be compatible with the heating element designs. The silica may be blended with alumina and other ceramics to improve properties such as refractoriness and corrosion resistance to molten metal.

The materials used for the refractory may include binders known to the industry such as cement, organic binders, and non-organic binders in addition to admixes such as flow agents, aerators, defoamers, densifiers, adhesives, and many other effects known to the industry. The binders provide strength in the green state, the cured condition prior to firing. The part must be capable of being demolded and handled to the furnace without breaking apart. When the part is baked in the furnace, full strength is achieved by localized sintering and other reactions which occur at elevated temperature.

Refractory materials may be brittle such that incorporation of fibers such as refractory ceramic fibers (RCF) may be used in the material. Fibers substantially stiffen the wet castable material which can be useful.

These materials, binders, admixes, and reinforcements are useful and sometimes necessary for fabrication and function of refractory and ceramic parts. However, they may also promote electrical conductivity of the parts especially at elevated temperature. When these parts are employed with any electrical conductors then leakage current may result making the system incompatible with GFCI protection because the leakage current would trip the GFCI. The disclosed shielding technology restores the leakage current to the GFCI making the system compatible with GFCI protection. This technology applies broadly to all ceramic shape working with conductors allowing numerous designs and functions to become compatible with GFCI protection. Ceramic parts which employ these materials, binders, admixes, and reinforcements can be made compatible with GFCIs using this technology. Ceramic parts using alternative fabrication techniques or materials for the sake of achieving GFCI compatibility may now adopt these materials, binders, admixes, and reinforcements while maintaining GFCI compatibility using this technology. Applications which omitted GFCI protection of parts because of nuisance tripping may adopt this technology to adopt GFCI protection.

While the primary embodiment disclosed herein includes a heated refractory component 500 forming a trough, embodiments of the refractory material and forming process described herein may be used for thimbles, spouts, pins, dams, transition plates, or the like. Essentially, any component of a casting process that uses refractory material and promotes the flow, distribution, holding, submersion, or other interaction of molten metal may benefit from the heated refractory component material and forming as described herein.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An electrically shielded heated component comprising:
   a refractory trough formed of a refractory material including a channel for conveying molten metal, wherein the channel defines a working surface of the trough;
   a conductor, wherein the conductor is a heating element powered and protected through a GFCI (ground fault circuit interrupter), wherein the conductor is embedded within the refractory material proximate the working surface; and
   a shield proximate the conductor, wherein the shield is embedded within the refractory material positioned between the working surface and the conductor, wherein the shield receives a portion of current from the conductor and returns the portion of the current received to the GFCI, wherein the shield returns the portion of the current to the GFCI by way of a neutral conductor.

2. The electrically shielded heated component of claim 1, wherein the neutral conductor shares electrical communication with the heating element.

3. The electrically shielded heated component of claim 1, wherein the portion of the current received at the shield comprises current leakage from the conductor, and wherein the current leakage is above an amperage at which the GFCI is configured to trip.

4. The electrically shielded heated component of claim 1, wherein the conductor and the shield are at least one of embedded within, partially embedded within, or affixed to the electrically shielded heated component.

5. The electrically shielded heated component of claim 4, wherein the electrically shielded heated component becomes increasingly electrically conductive at temperatures exceeding 400 degrees Celsius.

6. The electrically shielded heated component of claim 5, wherein the portion of the current comprises current leakage resulting from the electrical conductivity at elevated temperature exceeds 5 mA.

7. The electrically shielded heated component of claim 4, wherein the conductor is configured to heat a surface of the electrically shielded heated component to at least 400 degrees Celsius.

8. The electrically shielded heated component of claim 7, wherein the electrically shielded heated component is configured to contact molten metal.

9. A heated refractory component comprising:
   a trough section extending from a first end of the trough section to a second end of the trough section, the trough section configured to abut at least one additional trough section at the second end wherein the trough section is formed of a core material;
   a working surface of the heated refractory component;
   a heating element disposed within the core material;
   electrically conductive shielding between the working surface and the heating element, wherein current leaking from the heating element toward the working surface is substantially absorbed by the shielding, wherein the electrically conductive shielding extends around the heating element, between the heating element and the second end of the trough section;
   wherein the heating element is a conductor powered and protected through a circuit comprising a ground fault protective device, wherein the electrically conductive shielding returns current substantially absorbed by the shielding to the ground fault protective device by way of a neutral conductor.

10. The heated refractory component of claim 9, wherein the heating element is encapsulated within the core material and the shielding is encapsulated within the core material.

11. The heated refractory component of claim 9, further comprising:
    a first conductive lead for the heating element;
    a second conductive lead for the heating element; and a third conducive lead for the electrically conductive shielding.

12. The heated refractory component of claim 11, wherein the second conductive lead for the heating element is in electrical communication with the third conductive lead for the electrically conductive shielding at a circuit powering the heating element.

13. The heated refractory component of claim 9, wherein the ground fault protective device comprises a GFCI (ground fault circuit interrupter), and wherein the current leaking from the heating element is above an amperage at which the GFCI is configured to trip.

14. The heated refractory component of claim 13, wherein the heated refractory component contacts molten metal, and wherein the molten metal acts as a ground.

15. The heated refractory component of claim 14, wherein the electrically conductive shielding is disposed between the heating element and a non-working surface which will contact molten metal in response to a molten metal leak.

16. The heated refractory component of claim 9, wherein the heating element comprises a coiled resistance heating wire.

17. The heated refractory component of claim 16, wherein the electrically conductive shielding comprises a wire mesh disposed between the working surface and the heating element.

18. The heated refractory component of claim 9, wherein the electrically conductive shielding comprises wire disposed between the working surface and the heating element.

19. The heated refractory component of claim 9, wherein the heating element is configured to heat the working surface of the heated refractory component to at least 400 degrees Celsius.

20. A method for a heating a heated refractory component comprising:
   embedding a heating element within a refractory material forming a trough, wherein the trough defines a working surface along which molten metal flows, and wherein the heating element is disposed proximate the working surface;
   embedding electrically conductive shielding between the heating element and the working surface;
   supplying current to the heating element embedded within a refractory material forming the heated refractory component from a circuit protected with a GFCI (ground fault circuit interrupter); and
   receiving current leaking from the heating element at the electrically conductive shielding embedded within the core material, between the heating element and a working surface of the heated refractory component at the GFCI,
   wherein the current leaking to the electrically conductive shielding embedded within the core material prevents the GFCI from tripping due to the current leaking from the heating element.

21. The method of claim 20, further comprising:
   heating a working surface of the heated refractory component with the heating element to a temperature of at least 400 degrees Celsius.

* * * * *

UNITED STATES PATENT AND TRADEMARK OFFICE
CERTIFICATE OF CORRECTION

| | |
|---|---|
| PATENT NO. | : 12,089,301 B1 |
| APPLICATION NO. | : 18/356773 |
| DATED | : September 10, 2024 |
| INVENTOR(S) | : Nicholas Ryan Tebbe et al. |

It is certified that error appears in the above-identified patent and that said Letters Patent is hereby corrected as shown below:

In the Claims

In Column 17, Line 1, Claim 11, delete "conducive" and insert -- conductive --, therefor.

Signed and Sealed this
Fourth Day of February, 2025

Coke Morgan Stewart
*Acting Director of the United States Patent and Trademark Office*